US009129152B2

(12) United States Patent
Brandt et al.

(10) Patent No.: US 9,129,152 B2
(45) Date of Patent: Sep. 8, 2015

(54) EXEMPLAR-BASED FEATURE WEIGHTING

(71) Applicant: Adobe Systems Incorporated, San Jose, CA (US)

(72) Inventors: Jonathan Brandt, Santa Cruz, CA (US); Zhe Lin, Fremont, CA (US); Brandon M. Smith, Madison, WI (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 43 days.

(21) Appl. No.: 14/080,010

(22) Filed: Nov. 14, 2013

(65) Prior Publication Data

US 2015/0131873 A1 May 14, 2015

(51) Int. Cl.
*G06K 9/00* (2006.01)
*G06K 9/62* (2006.01)

(52) U.S. Cl.
CPC ........ G06K 9/00295 (2013.01); G06K 9/00268 (2013.01); G06K 9/6215 (2013.01); *G06K 9/00* (2013.01)

(58) Field of Classification Search
USPC ......... 382/103, 118, 154, 260, 209, 224, 229, 382/128, 195; 348/47, 143, 169
See application file for complete search history.

(56) References Cited

U.S. PATENT DOCUMENTS

| | | | | |
|---|---|---|---|---|
| 8,311,294 B2* | 11/2012 | Myers et al. | | 382/118 |
| 8,477,998 B1* | 7/2013 | Kim et al. | | 382/103 |
| 8,582,897 B2* | 11/2013 | Sabe | | 382/229 |
| 8,599,266 B2* | 12/2013 | Trivedi et al. | | 348/169 |
| 8,903,130 B1* | 12/2014 | Carceroni et al. | | 382/103 |
| 8,908,987 B1* | 12/2014 | Krishnaswamy et al. | | 382/260 |
| 8,913,103 B1* | 12/2014 | Sargin et al. | | 348/14.12 |
| 2003/0123713 A1* | 7/2003 | Geng | | 382/118 |
| 2006/0251339 A1* | 11/2006 | Gokturk et al. | | 382/305 |
| 2006/0253491 A1* | 11/2006 | Gokturk et al. | | 707/104.1 |
| 2006/0285665 A1* | 12/2006 | Wasserblat et al. | | 379/114.14 |
| 2007/0276723 A1* | 11/2007 | Samid | | 705/12 |
| 2009/0060288 A1* | 3/2009 | Myers et al. | | 382/118 |
| 2009/0185746 A1* | 7/2009 | Mian et al. | | 382/209 |
| 2010/0034440 A1* | 2/2010 | Zhan et al. | | 382/128 |
| 2013/0223694 A1* | 8/2013 | Ricanek et al. | | 382/118 |
| 2013/0223704 A1* | 8/2013 | Lay et al. | | 382/128 |
| 2013/0294642 A1* | 11/2013 | Wang et al. | | 382/103 |
| 2014/0147022 A1* | 5/2014 | Zhou et al. | | 382/118 |

* cited by examiner

*Primary Examiner* — Vu Le
*Assistant Examiner* — Aklilu Woldemariam
(74) *Attorney, Agent, or Firm* — Shook, Hardy & Bacon L.L.P.

(57) ABSTRACT

In an example embodiment, for each of the image exemplars, a first location offset between an actual landmark location for a first landmark in the image exemplar and a predicted landmark location for the first landmark in the image exemplar is determined. Then, a probability that the image recognition process applied using the first feature produces an accurate identification of the first landmark in the image exemplars is determined based on the first location offsets for each of the image exemplars. A weight may then be assigned to the first feature based on the derived probability. An image recognition process may then be performed on an image, the image recognition process utilizing a voting process, for each of one or more features, for one or more landmarks in the plurality of image exemplars, the voting process for the first feature weighted according to the weight assigned to the first feature.

18 Claims, 11 Drawing Sheets

Left Eye

Nose

Right Eye

Left Mouth Corner

Mouth Center

Right Mouth Corner

US 9,129,152 B2

EXEMPLAR-BASED FEATURE WEIGHTING

FIELD

The present disclosure relates generally to image recognition. More specifically, the present disclosure relates to changing exemplar-based feature weighting, which can be used to improve facial recognition.

BACKGROUND

Image recognition, and specifically facial recognition, has significantly grown in use as the processing power of computers has increased. Facial recognition is used in a wide variety of industries, including security, government, social networking services, and media. Recently, consumer software has also relied upon facial recognition, especially in the area of image enhancement and editing software. For example, a photo may be enhanced by reducing red-eye caused by a camera flash, but that process requires identification of the eyes in a photo prior to performing the enhancement technique. Key areas of the face, such as the eyes, mouth, nose, ears, and so forth, may be referred to as "landmarks." Thus, these techniques may be useful for face attribute recognition, face recognition and verification, face image retrieval, and automated portrait retouching, for example.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, facial recognition techniques may be improved using exemplar-based feature weighting. Exemplar-based feature weighting helps improve facial landmark localization accuracy and robustness, especially for challenging faces in real-world images where large variations in illumination, facial expression, pose, race, identity, and the like are commonplace. Given a database of face exemplars, each with a set of extracted features and hand-labeled landmarks, the system may automatically learn a weight for each feature-landmark pair. Each weight reflects the probability that the corresponding feature will accurately estimate the landmark location in a test image. These weights may then be used to select only the relevant features for landmark localization, which reduces the number of features in the database.

Figure 1:
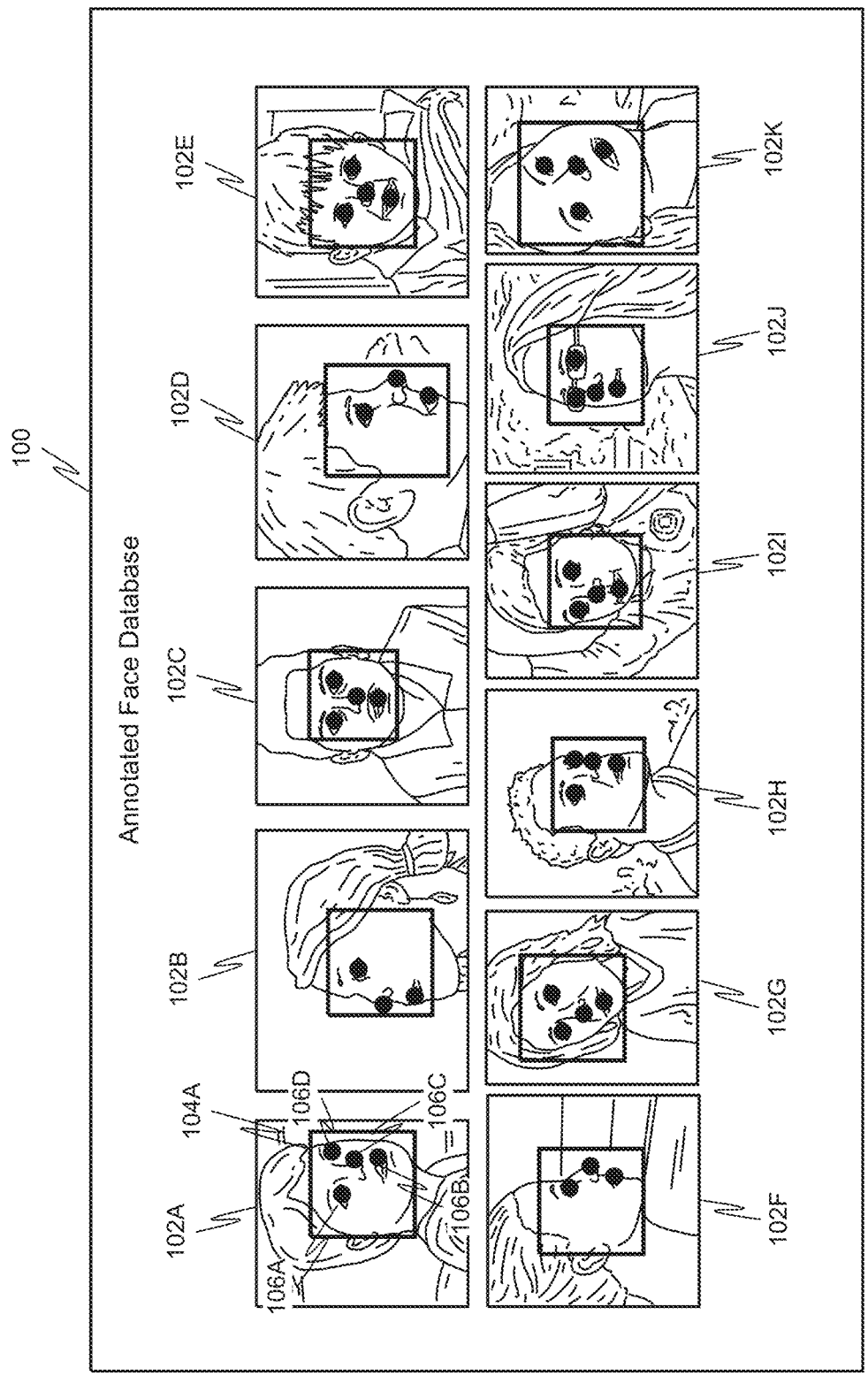
FIG. 1 is a diagram illustrating an example database of exemplars, in accordance with an example embodiment.

Exemplar-based face detection involves using a database of face images, called exemplars, with each face labeled by a bounding rectangle. FIG. 1 is a diagram illustrating an example database 100 of exemplars, in accordance with an example embodiment. As can be seen, the database contains exemplars 102A-102K. Each exemplar 102A-102K may contain a bounding rectangle, e.g., 104A reflecting the borders of the face, and one or more landmarks, e.g. 106A, 106B, 106C, 106D reflecting key areas of the face. This is in contrast to prior art techniques where facial shape and appearance variation are explicitly modeled. The database of exemplars is used to "vote" for face locations in a test image.

Figure 2:
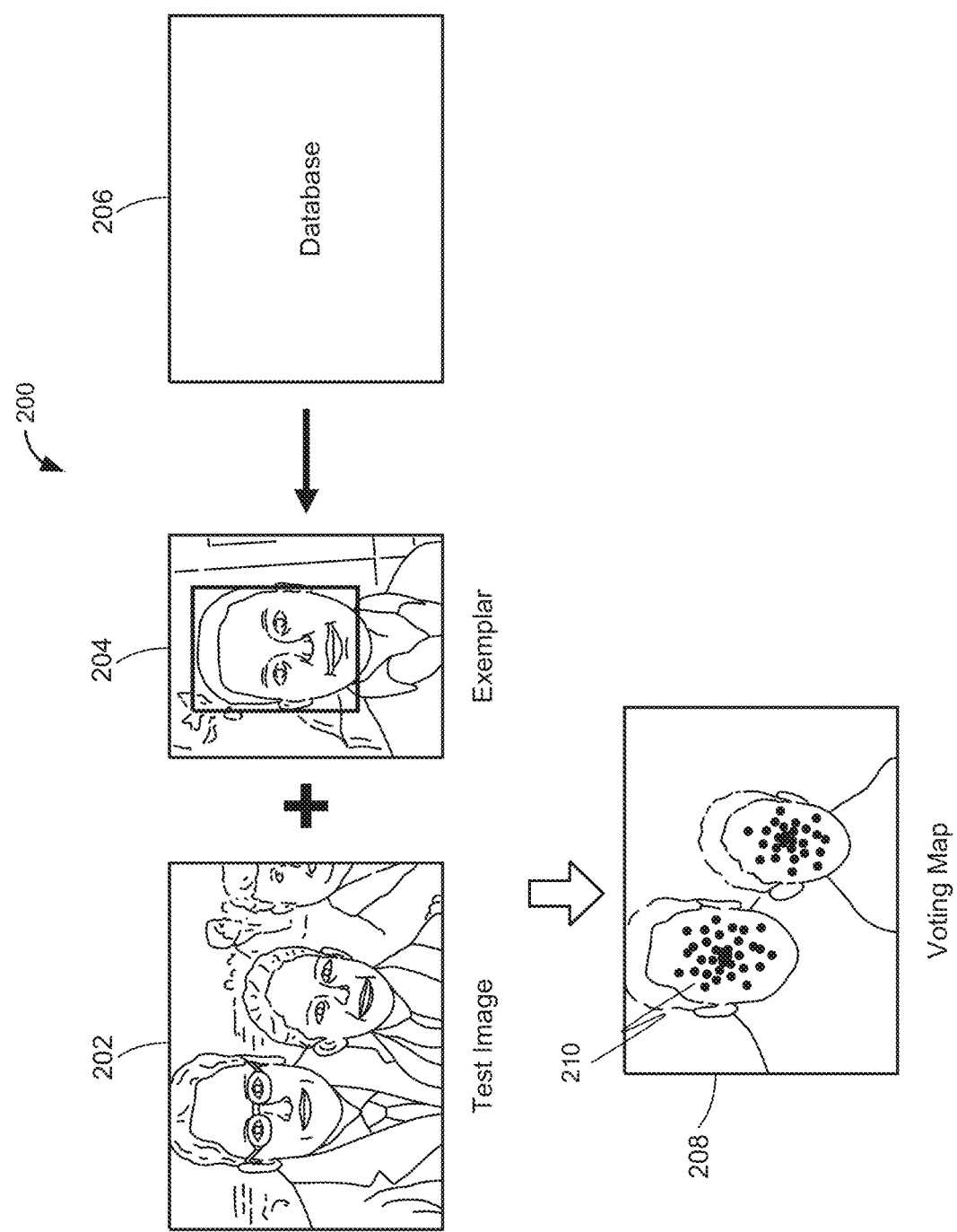
FIG. 2 is a diagram illustrating a method for creating a voting map for a test image, in accordance with an example embodiment.

FIG. 2 is a diagram illustrating a method 200 for creating a voting map for a test image, in accordance with an example embodiment. Here, the test image 202 is compared to each exemplar 204 in the database 206, and votes are registered from this comparison. The votes are tallied on a voting map 208 for the test image 202. In this figure, only a single exemplar 204 is depicted, but in practice all the exemplars in the database 206 will be used and the corresponding votes placed on the voting map created for each. The voting map reflects the votes for the likely landmark or landmarks in the test image, as determined using the exemplars. As can be seen, votes (e.g., 210) tend to be clustered around the landmark of interest. Here, the landmark of interest is the left eye (from the point of view of the viewer, not the subject of the photo), and the votes are clustered around the left eye of each subject in the test image.

One way to perform this would be to exhaustively slide each exemplar face over the test image. However, this is very processor-intensive and would take a lot of time. Another method could be to quantize features and employ an inverted index file to efficiently find matched features in the database. A spatially constrained similarity measure could be computed using multi-scale generalized Hough-voting. Hough-voting is a feature extraction technique used to find imperfect instances of objects within a certain class of shapes by a voting procedure. The voting procedure is carried out in a parameter space, from which object candidates are obtained as local maxima in a so-called accumulator space that is explicitly constructed by an algorithm. The similarity measure between each exemplar face and each location in the test image may be $$S(Q, D \mid T) = \sum_{k=1}^{N} \sum_{(f_i, g_j)} \frac{idf^2(k)}{tf_Q(k) \cdot tf_D(k)}$$

$$f_i \in Q, g_j \in D$$

$$w(f_i) = w(g_j) = k$$

$$\|T(L(f_i)) - L(g_j)\| < \varepsilon$$

where k denotes the k-th visual word in the vocabulary, N is the vocabulary size, Q denotes a candidate object bounding box in the query image, D denotes the (known) object bounding box in a database image, $\{f_1, f_2, \ldots, f_m\}$ are features extracted from Q, and $\{g_1, g_2, \ldots, g_n\}$ are features extracted from D. If $w(f_i)=w(g_j)=k$, then $f_i$ and $g_j$ are both assigned to the visual word k. $L(f)=(x_f, y_f)$ is the two-dimensional (2D) image location of f, and $T(L(f))$ is its location in D after a transformation T. The spatial constraint $\|T(L(f_i))-L(g_j)\|<\epsilon$ means that, after transformation, the locations of the two matched features should be sufficiently close.

idf(k) is the inverse document frequency of visual word k and $tf_Q(k)$, and $tf_D(k)$ are the term frequencies (e.g., number of occurrences) of visual word k in Q and D, respectively. The term $$\frac{idf^2(k)}{tf_Q(k) \cdot tf_D(k)}$$

is a score on every feature match. This serves two purposes. First, it penalizes features that occur frequently in the database (common features are probably less discriminative). Second, it penalizes visual words that occur repeatedly in the same image (features from repeated image patterns may be more ambiguous than unique features).

Additionally, each feature match may be modulated by a spatial weight $s_j$ based on the proximity of $g_j$ to the center of D $$s_j = \exp\left\{-\frac{\|L(g_i) - L(d)\|^2}{\sigma^2}\right\}$$

where L(d) is the 2D image location at the center of the exemplar face D and σ is proportional to the size of D. Features close to the center of the exemplar face may produce more reliable votes for faces than for other features.

The idf-based score and the spatial weight together form a single weight:

$$w_j = s_j \cdot \frac{idf^2(k)}{tf_Q(k) \cdot tf_D(k)}$$

Each $w_j$ may be thought of as an attempt to predict whether each vote will be accurate or not by emphasizing likely good votes and de-emphasizing likely bad votes. The formulation of $w_j$ may be performed heuristically. However, in an example embodiment, each $w_j$ is automatically learned in a data-driven way. A set of weights (one weight for each landmark-feature pair) may be learned for each exemplar image, and from that a final set of landmark location estimates can be produced for each detected face in a test image.

For simplicity, and without loss of generation, this disclosure will focus on only one landmark. However, one of ordinary skill in the art will recognize that the described techniques can be applied to numerous landmarks.

Let $f_i^r$ be feature i in exemplar r and let D(r) be the landmark location in exemplar r. The goal for the system is to learn the probability that $f_i^r$ will vote for the correct landmark location in other face images. Voting for the correct landmark location means that the relative location offset (relative to the size of the face) from $L(f_i^r)$ to the landmark location D(r), or $\Delta L(f_i^r) = D(r) - L(f_i^r)$, is approximately the same as the offset from $L(f_i^{r'})$ to $D(r')$ in the other exemplars where $r' \neq r$, assuming that $w(f_i^{r'})=w(f_i^r)$. For "other face images", the other exemplars in the database can be used. In an example embodiment, the above probability can be computed as follows:

$$p(\Delta L(f_i^r)) = \sum_{r' \neq r} \sum_{j} \frac{\Psi(\|\Delta L(f_i^r) - \Delta L(f_j^{r'})\|)}{N}$$

where the summation is over all features in the other exemplar images that share the same visual word, and N is a normalization factor, which in one example embodiment may be the total number of votes cast by $f_i^r$.

The function $\Psi(\|\Delta L(f_i^r)-\Delta L(f_j^{r'})\|)$ quantifies the notion of "approximately the same offset". For example, it could be 1 if $x<\epsilon$ or 0, or it could be Gaussian $$\exp\left\{-\frac{x^2}{2\sigma^2}\right\}.$$

The probability is the number of correct votes divided by the number of votes cast by the feature.

Since $\Delta L(f_i^r)=D(r)-L(f_i^r)$ then $\|\Delta L(f_i^r)-\Delta L(f_i^{r'})\|=\|(D(r)-L(f_i^r))-\Delta L(f_i^{r'})\|=\|D(r)-L(f_i^r)\|+\Delta L(f_i^{r'})$. Thus the weights can be calculated by first generating a single voting map for $f_i^r$, where each vote is cast at location $V=L(f_i^r)+\Delta L(f_i^{r'})$ in exemplar r. Then the number of correct votes (e.g., the votes near D(r)) is divided by the total number of votes.

It should be noted that the location V of each vote includes some spatial noise. This may include, for example, the feature locations being quantized to the image grid, the scale of the exemplar faces differing slightly; even very similar faces exhibiting some shape variation, which can affect $\Delta L(f_i^{r'})$; and, because landmark locations were hand-labeled by different people, small inconsistencies existing between exemplars. The parameters $\epsilon$ and σ can be chosen to account for spatial noise. $\Psi_g$ can also be used as it better models noise and does not impose a hard threshold. The spatial bandwidth σ can be set empirically, but it could be computed in a more principled way using statistics from the data.

In an example embodiment, an offline training step may be used to compute $p(\Delta L(f_i^r))$ for all features j in all exemplars r. This forms a set of weights for one landmark, which may be used in place of the idf-based weights $w_j^r$. A separate set of feature-specific weights can be computed for each type of landmark in each exemplar image.

In an example embodiment, when training the weights for one exemplar, only similar faces may be used. For example, a left profile face may be unsuitable for training the weights for a right profile face. Therefore, to train the weights for exemplar r, only a subset of other exemplars that are similar to r may be used. This reflects the input of the landmark localization algorithm, which is a face bounding box in the test image and a set of top exemplar faces returned by a validation step.

Figure 3A:
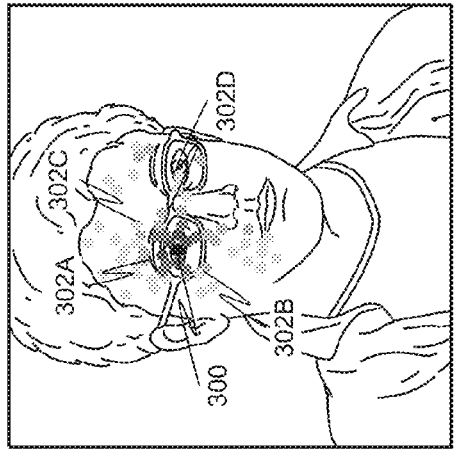
FIGS. 3A-3F are diagrams illustrating learned feature weights for various landmarks in one exemplar image, in accordance with an example embodiment.
Figure 3B:
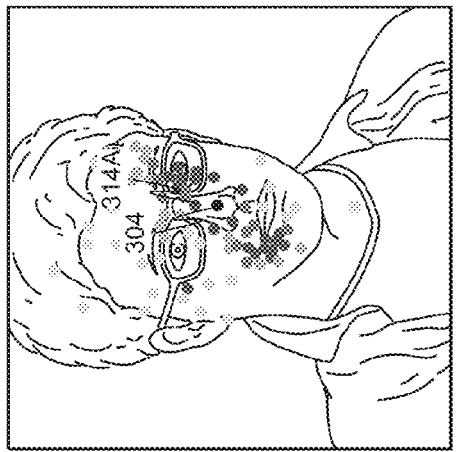
Figure 3C:
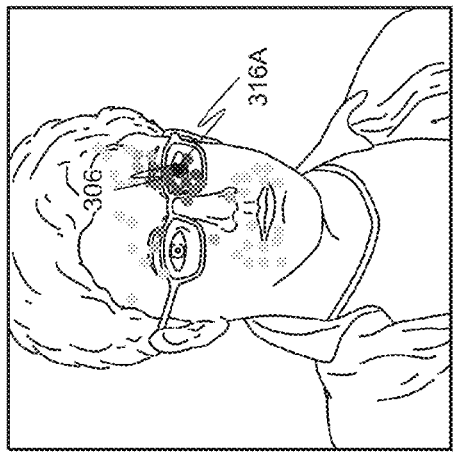
Figure 3D:
Figure 3E:
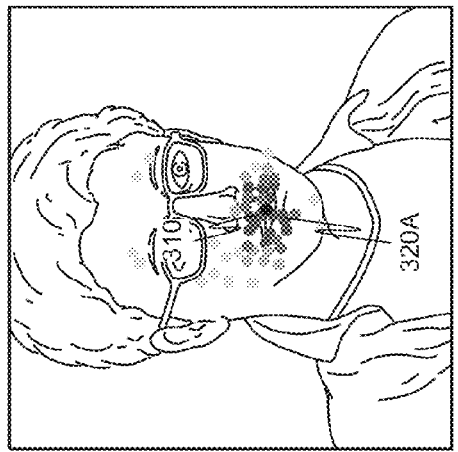
Figure 3F:

FIGS. 3A-3F are diagrams illustrating learned feature weights for various landmarks in one exemplar image, in accordance with an example embodiment. Each of these figures represent the learned feature weights for a different landmark. Referring to FIG. 3A, the landmark here is a left eye. The darker the shade of the feature location, the higher the magnitude of the weight at each feature location. The solid black point 300 indicates the ground truth location of the landmark, in this figure the left eye. The feature locations, such as 302A, 302B, 302C, 302D have lighter and darker shading in accordance with their weights. For visualization purposes, the weights here are smoothed and normalized so that the maximum weight in each image is 1.0. Similar solid black points 304, 306, 308, 310, 312 in the other figures also then represent the ground truth of their respective landmarks (nose, right eye, left mouth corner, mouth center, and right mouth corner, respectively). It can be seen that higher weighed feature locations, such as 302A, 314A, 316A, 318A, 320A, and 322A, naturally correspond to unambiguous features on the face and features close to each landmark. During the landmark location estimation process, a landmark estimate and a landmark score may be utilized to identify the precise mid-point of the landmark. In an example embodiment, the landmark estimate may be the peak location in the voting map while the landmark score may be the peak height in the voting map. As will be described later, there may be other alternatives that may operate more efficiently in certain circumstances.

Figure 4:
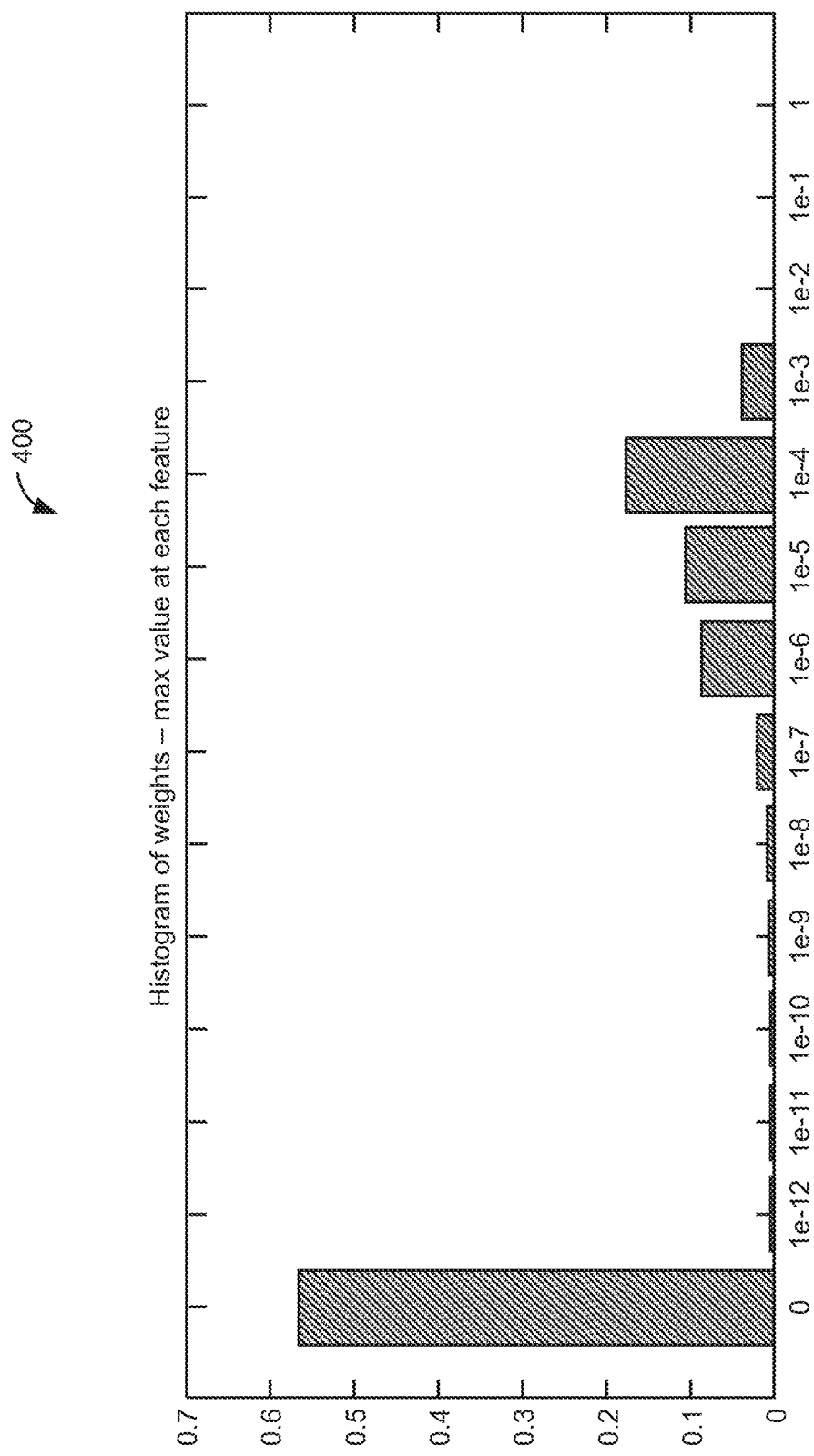
FIG. 4 is a diagram illustrating a histogram of feature weights in a database, in accordance with an example embodiment.

FIG. 4 is a diagram illustrating a histogram 400 of feature weights in a database, in accordance with an example embodiment. This histogram 400 counts only the maximum landmark-specific weight at each feature. It can be seen that approximately 60% of the features have all zero weights, which means they can be removed from the database and not utilized in further analysis, thus improving efficiency and speed.

Figure 5:
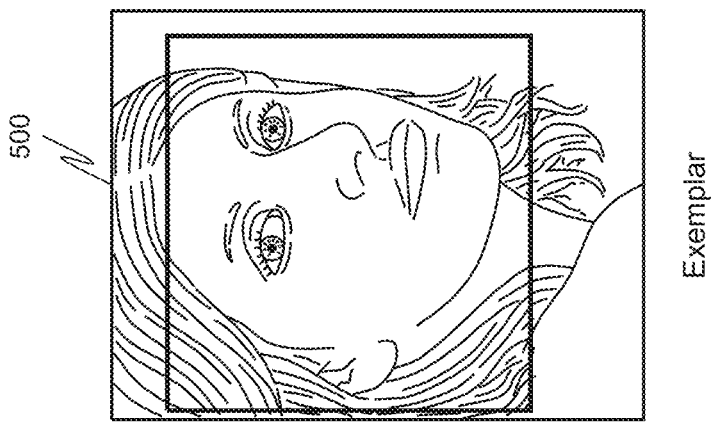
FIG. 5 is a diagram illustrating an exemplar and a test image being out of rotation with each other, in accordance with an example embodiment.
Figure 5:
Figure 6:
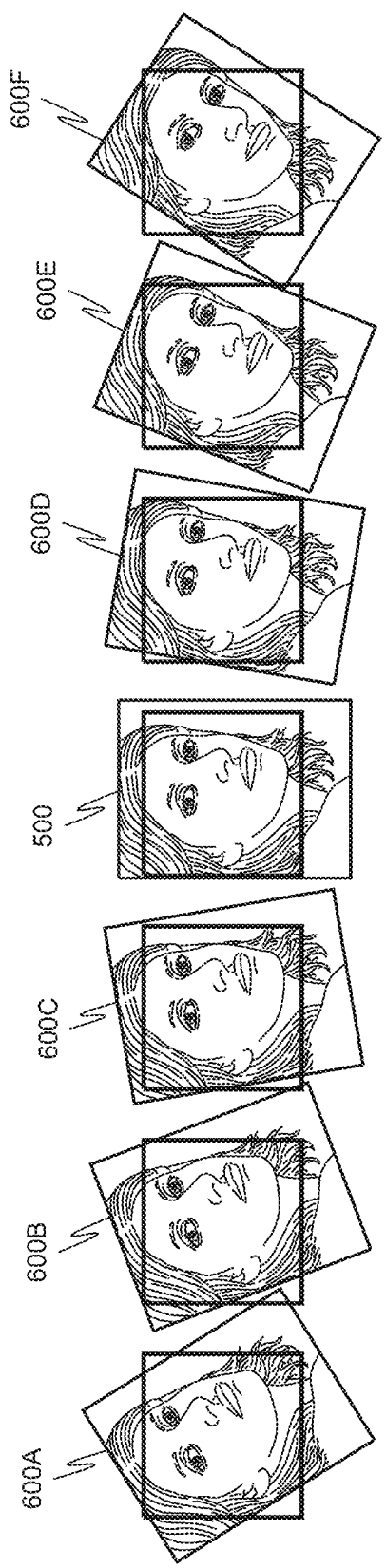
FIG. 6 is a diagram depicting a series of transformative variations of an exemplar, in accordance with an example embodiment.

One additional issue that may arise is that one or more of the exemplars may give inaccurate votes due merely to a difference in some transformation between the exemplar and the test image. One example transformation may be rotation. FIG. 5 is a diagram illustrating an exemplar 500 and a test image 502 being out of rotation with each other, in accordance with an example embodiment. As can be seen, the face in the exemplar 500 is approximately perpendicular to the horizon, whereas the face in the test image 502 is at an approximate 45 degree angle to the horizon. Use of this exemplar 500 in the weighting computation process for this test image, therefore, may yield inaccurate results. In an example embodiment, each exemplar is utilized multiple times, with a different transformation, as part of the weight determination process. Thus, for example, rather than simply use exemplar 500, exemplar 500 and a series of transformative variations of exemplar 500 are used in comparison to the test image 502. This is depicted in FIG. 6, which depicts a series of transformative variations 600A-600F of exemplar 500, in accordance with an example embodiment. Here, exemplar 500 is rotated 45 degrees in each direction, at various intervals, to create the transformative variations 600A-600F. A score is derived for each transformative variation 600A-600F, along with the original exemplar 500, and the variation (or original) with the highest score is selected as the one to use for the weighting calculations. The score may either be the landmark score for a particular landmark, as described above, or may be a combination score assigned to a series of landmarks. This may be known as a full face score and may be the summation (or average) of all the landmark scores for each landmark in an image. Thus, the transformation (or original) with the highest full face score may be selected for use in the weighting process. In FIG. 6, this is likely to be transformative variation 600F, which more closely resembles the angle of the face of the test image 502 from FIG. 5.

Figure 7:
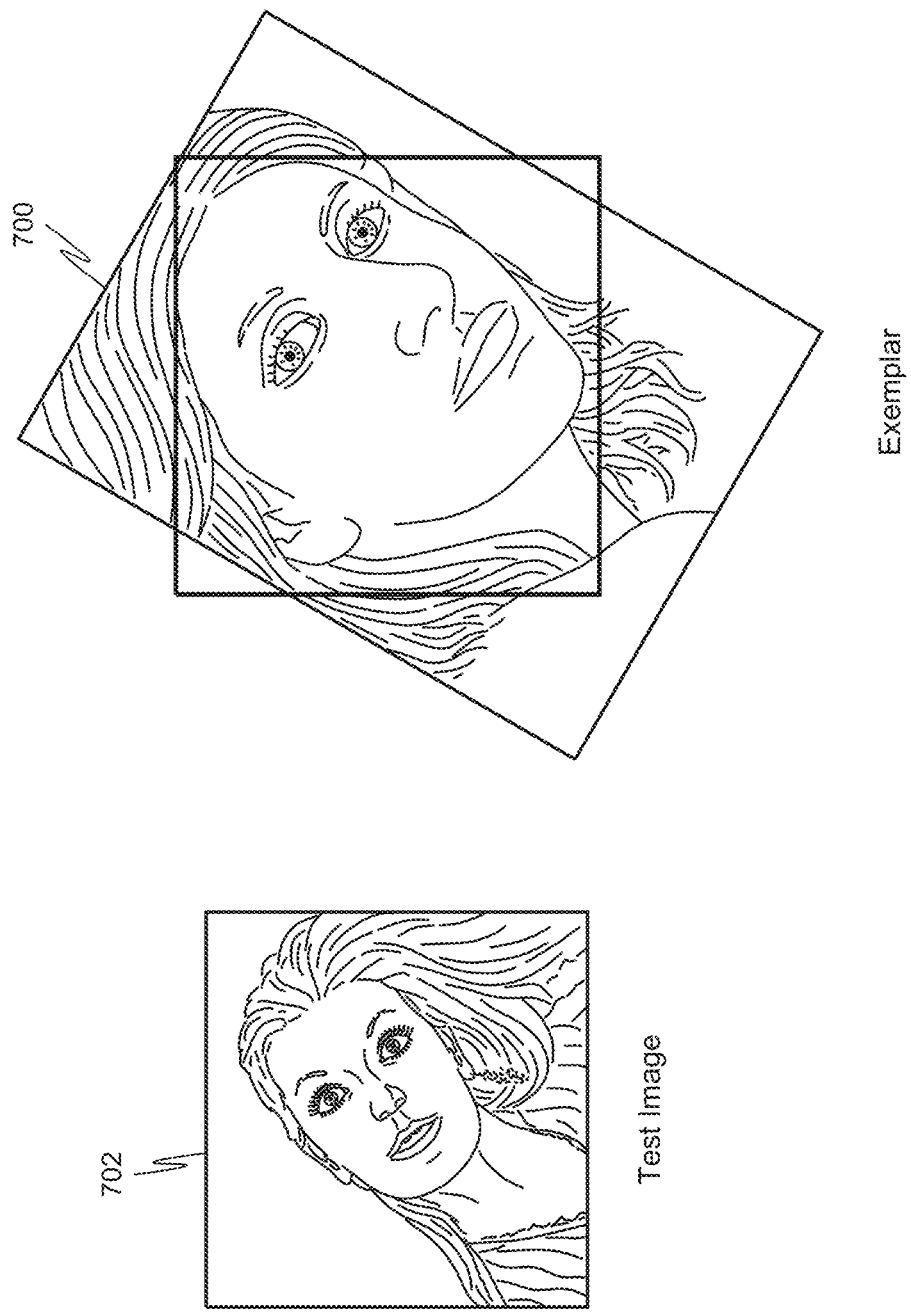
FIG. 7 is a diagram illustrating an exemplar and a test image having different scales, in accordance with an example embodiment.
Figure 8:
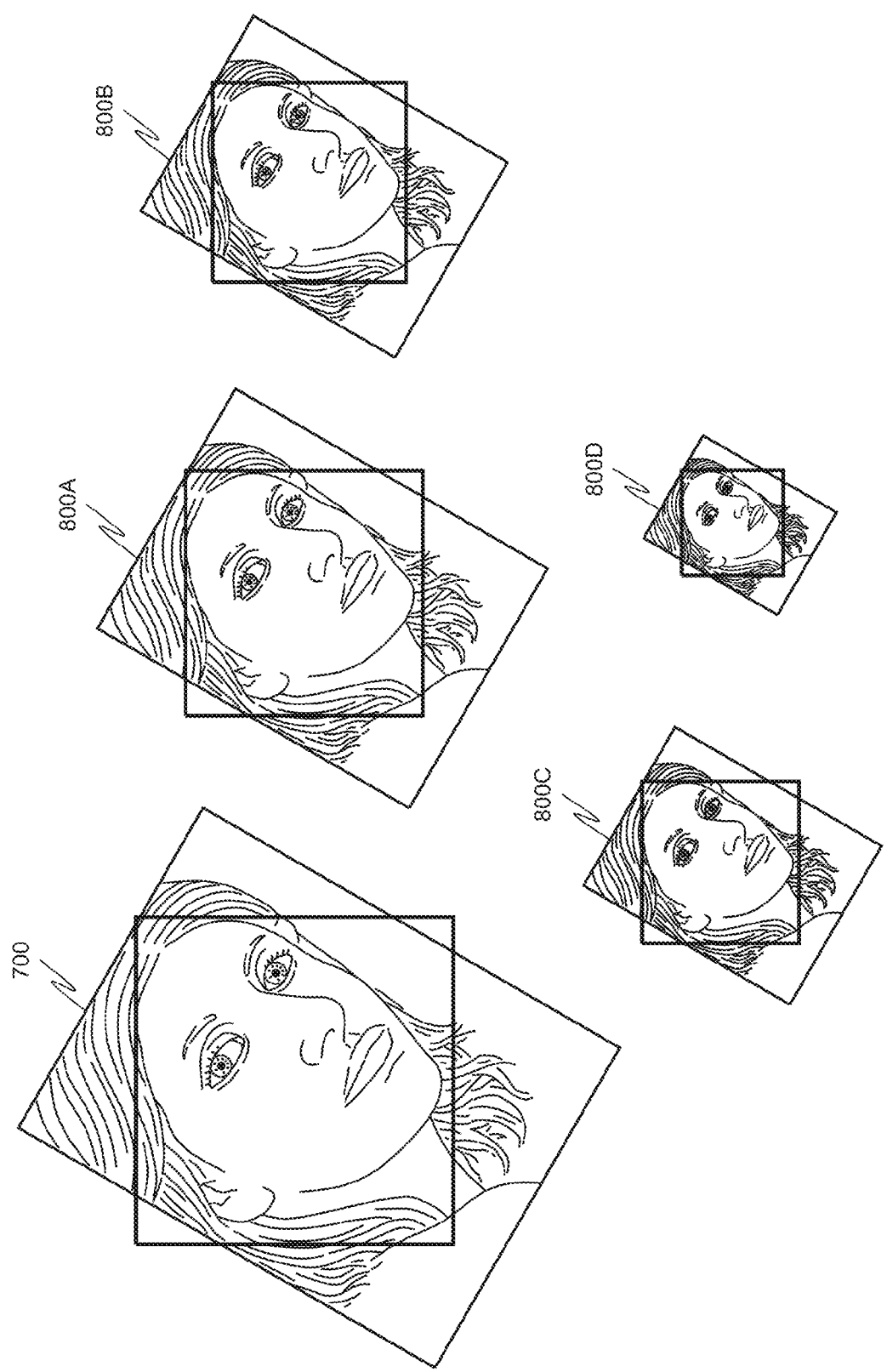
FIG. 8 depicts a series of transformative variations of an exemplar, in accordance with an example embodiment

Rotation is not the only transformation that can be used to create multiple potential exemplars from one exemplar. Scale is another example of a transformation that can be used. FIG. 7 is a diagram illustrating an exemplar 700 and a test image 702 having different scales, which potentially means that the use of exemplar 700 for computing the weights may result in inaccurate values for the weights, in accordance with an example embodiment. Similarly to rotation, transformative variations may be created based on scale as well. FIG. 8 depicts a series of transformative variations 800A-800D of exemplar 700, here representing different scaled versions of exemplar 700, in accordance with an example embodiment. Once again, the transformative variation 800A-800F with the highest full face score may be selected for use in the weighting process.

While rotation and scale are discussed above, this disclosure is not limited to these examples. Any potential transformation can be used to improve results.

Figure 9:
FIG. 9 is a diagram illustrating an example of an image having multiple peaks.

Another issue that may arise is the presence of multiple peaks. This occurs when there are different features in the same image that resemble each other. FIG. 9 is a diagram illustrating an example of an image having multiple peaks. As can be seen, the image is that of two older women. When identifying a feature, such as the left side of the mouth, the jowls may give false positives. This results in points 900A, 900B, 900C, 900D all being identified as peaks for a left side of the mouth, even though points 900A and 900C are the only real corners of the mouth.

In an example embodiment, nonparametric shape regularization is used to help alleviate the issue of multiple peaks. The most straightforward strategy for estimating landmark locations given a set of independent voting maps is to choose the location of the maximum peak. However, because landmarks can be occluded, weak, or ambiguous, this strategy can lead to landmark estimates that do not correspond to plausible face shapes.

Nonparametric shape regularization incorporates an implicit shape constraint into the landmark localization pipeline. The input to a nonparametric shape regularization algorithm is a set of landmark response maps and a set of exemplar face shapes (spatial arrangement of landmarks). In an example embodiment, discriminative landmark-specific detectors can be used to generate response maps. However, in another example embodiment, landmark voting maps as described above may be used. Additionally, while a preset number of exemplar shapes are utilized in some example embodiments, in other example embodiments a fluid number of exemplars can be used (in one example, the top R face exemplars returned by the validation step described above).

For each landmark response map, the largest C modes are chosen as candidate locations. A generate-and-test approach is then used to fit the exemplar shapes to the set of response maps as follows:

1. Select a random exemplar shape r.
2. Select a random candidate location from two different randomly chosen landmark response maps.
3. Compute a similarity transformation t using the two locations from 2 and the corresponding two locations in exemplar r; transform r using t.

4. Score the r-t pair by $\Pi_l p(x_{r,t}^l | map^l)$, where $x_{r,t}^l$ is the 2D location of landmark l from exemplar r transformed by t and $p(x_{r,t}^l | map^l)$ is the value at $x_{r,t}^l$ in the l-th landmark response map.

5. Repeat steps 1-4 many times (e.g., 10,000 times).

6. Record the set M of the best scoring r-t pairs (e.g., |M|=100)

The final location estimate for landmark l may then be computed as $$x^l = \operatorname{argmax}_{x^l} \sum_{t,t \in M} p(\Delta x_{r,t}^l) \cdot p(x^l | map^l),$$

where $p(\Delta x_{r,t}^l)$ is taken to be a Gaussian distribution centered at $x_{r,t}^l$. This amounts to finding the peak location in the new response map. The new response map is an element-wise multiplication of two response maps: (1) the original response map (e.g., the landmark voting map), and (2) a Gaussian-smoothed version of the generate-and-test voting map. The result is a set of landmark estimates coincident with the peaks in the voting maps and also consistent with the spatial arrangement of landmarks in the top exemplar faces.

Figure 10:
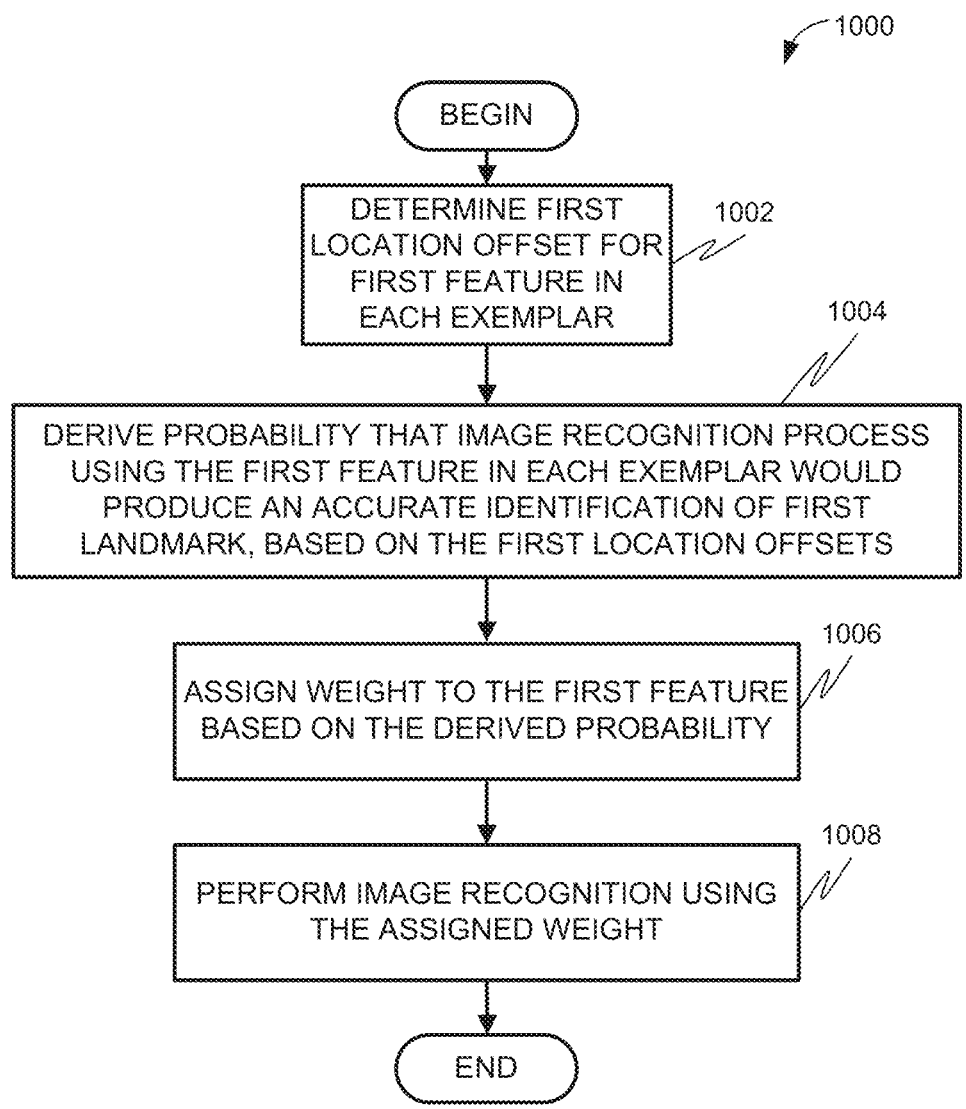
FIG. 10 is a flow diagram illustrating a method, in accordance with an example embodiment, of performing image recognition using a plurality of image exemplars, with each of the image exemplars having a plurality of features.

FIG. 10 is a flow diagram illustrating a method 1000, in accordance with an example embodiment, of performing image recognition using a plurality of image exemplars, with each of the image exemplars having a plurality of features. At operation 1002, for each of the image exemplars, a first location offset between an actual landmark location for a first landmark in the image exemplar and a predicted landmark location for the first landmark in the image exemplar is determined, with the predicted landmark location derived using an image recognition process using a first feature of the image exemplar. At operation 1004, a probability that the image recognition process applied using the first feature produces an accurate identification of the first landmark in the image exemplars is derived based on the first location offsets for each of the image exemplars. At operation 1006, a weight is assigned to the first feature based on the derived probability. At operation 1008, the image recognition process is performed on an image, the image recognition utilizing a voting process, for each one or more features, for one or more landmarks in the plurality of image exemplars, the voting process for the first feature weighted according to the weight assigned to the first feature.

Figure 11:
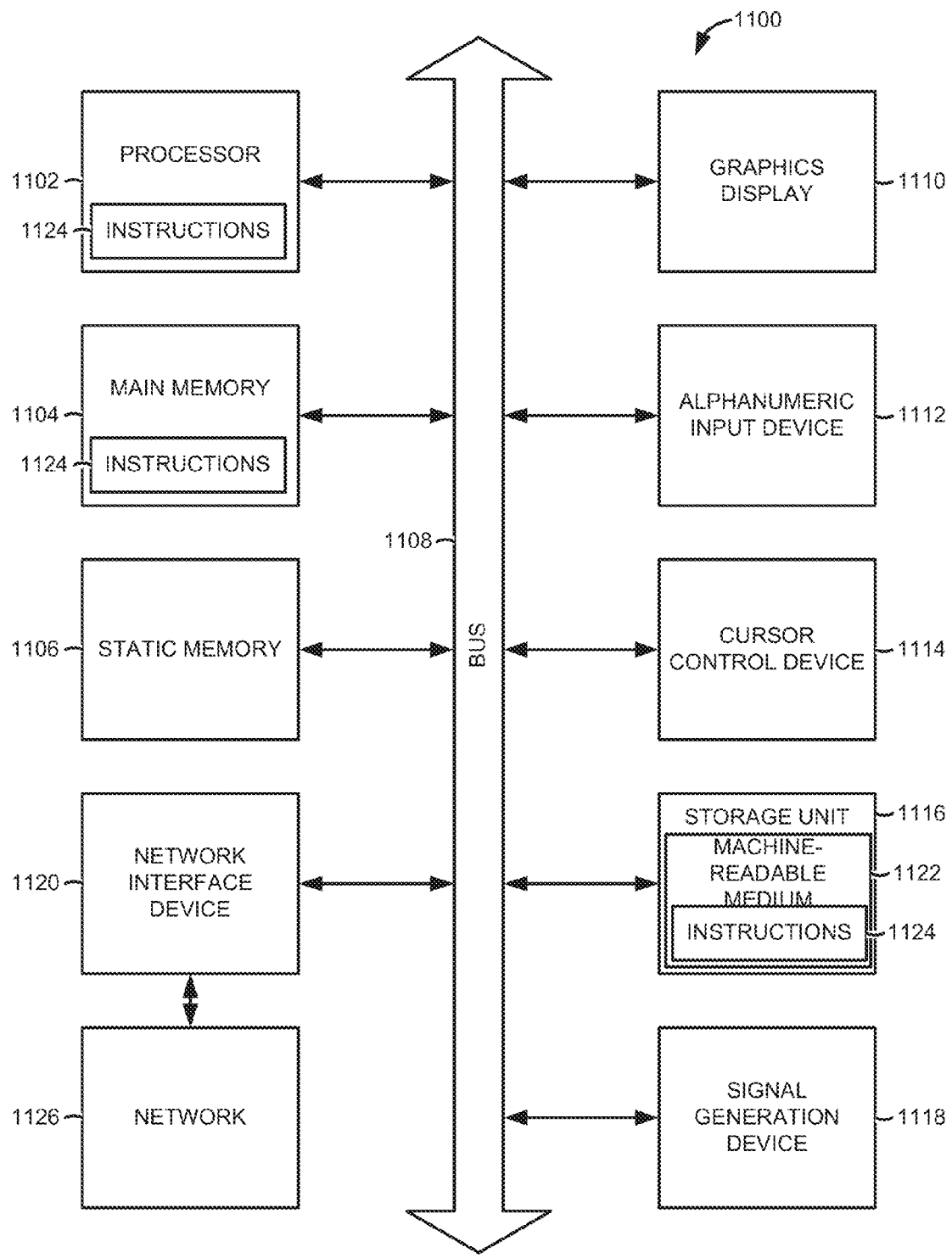
FIG. 11 is a block diagram of a computer processing system at a server system, within which a set of instructions may be executed for causing the computer to perform any one or more of the methodologies discussed herein.

FIG. 11 is a block diagram of a computer processing system 1100 at a server system, within which a set of instructions may be executed for causing the computer to perform any one or more of the methodologies discussed herein.

Example embodiments may also, for example, be deployed by Software-as-a-Service (SaaS), application service provider (ASP), or utility computing providers, in addition to being sold or licensed via traditional channels. The computer may be a server computer, a PC, a tablet PC, a set-top box (STB), a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1100 includes processor 1102 (e.g., a central processing unit (CPU), a GPU, or both), main memory 1104, and static memory 1106, which communicate with each other via bus 1108. The processing system 1100 may further include graphics display unit 1110 (e.g., a plasma display, a liquid crystal display (LCD), or a cathode ray tube (CRT)). The processing system 1100 also includes alphanumeric input device 1112 (e.g., a keyboard), a cursor control device 1114 (e.g., a mouse, touch screen, or the like), a storage unit 1116, a signal generation device 1118 (e.g., a speaker), and a network interface device 1120.

The storage unit 1116 includes machine-readable medium 1122 on which is stored one or more sets of instructions 1124 and data structures (e.g., software) embodying or utilized by any one or more of the methodologies or functions described herein. The instructions 1124 may also reside, completely or at least partially, within the main memory 1104 and/or within the processor 1102 during execution thereof by the processing system 1100, with the main memory 1104 and the processor 1102 also constituting machine-readable, tangible media.

The instructions 1124 may further be transmitted or received over network 1126 via a network interface device 1120 utilizing any one of a number of well-known transfer protocols (e.g., HTTP).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions 1124. The term "machine-readable medium" shall also be taken to include any medium that is capable of storing, encoding, or carrying a set of instructions for execution by the computer and that cause the computer to perform any one or more of the methodologies of the present application, or that is capable of storing, encoding, or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

What is claimed is:

1. A method of performing image recognition using a plurality of image exemplars, each of the image exemplars having a plurality of features, the method comprising:

for each of the image exemplars, determining a first location offset between an actual landmark location for a first landmark in the image exemplar and a predicted landmark location for the first landmark in the image exemplar, the predicted landmark location derived using an image recognition process using a first feature of the image exemplar, wherein the first location offset for each of the image exemplars is relative to a size of a face in each of the image exemplars;

deriving a probability that the image recognition process applied using the first feature produces an accurate identification of the first landmark in the image exemplars based on the first location offsets for each of the image exemplars;

assigning a weight to the first feature based on the derived probability; and performing the image recognition process on an image, the image recognition process utilizing a voting process, for each of one or more features, for one or more landmarks in the plurality of image exemplars, the voting process for the first feature weighted according to the weight assigned to the first feature.

2. The method of claim 1, wherein the deriving the probability utilizes the formula $$p(\Delta L(f_i^r)) = \sum_{r' \neq r} \sum_j \frac{\Psi(\|\Delta L(f_i^r) - \Delta L(f_j^{r'})\|)}{N},$$

wherein N is a normalization factor, $f_i^r$ is feature i in exemplar r, and D(r) is a landmark location in exemplar r.

3. The method of claim 1, wherein the deriving a probability includes summing all of the first location offsets for the image exemplars.

4. The method of claim 1, wherein the plurality of image exemplars are chosen such that only similar faces are utilized, wherein faces are similar if images depict the faces from approximately the same angle, rotation, and scale.

5. The method of claim 1, wherein the image recognition process is weighted for each feature in the plurality of exemplar images.

6. The method of claim 1, wherein the image recognition process is a Hough-voting technique.

7. The method of claim 1, wherein the weight assigned to the first feature is further modulated by a spatial weight based on the proximity of the first feature to the first landmark.

8. The method of claim 1, further comprising generating an additional plurality of image exemplars by applying one or more transformations to one or more image exemplars.

9. The method of claim 1, further comprising nonparametric shape regularization by using a dynamic number of top face exemplars and ensuring that the selected landmark locations using the image recognition process are also consistent with the spatial arrangement of landmarks in the dynamic number of top face exemplars.

10. An apparatus comprising:
memory;
a processor;
an exemplar-based feature weighting module configured to:

for each of the image exemplars, determine a first location offset between an actual landmark location for a first landmark in the image exemplar and a predicted landmark location for the first landmark in the image exemplar, the predicted landmark location derived using an image recognition process using a first feature of the image exemplar, wherein the first location offset for each of the image exemplars is relative to a size of a face in each of the image exemplars;

derive a probability that the image recognition process applied using the first feature produces an accurate identification of the first landmark in the image exemplars based on the first location offsets for each of the image exemplars;

assign a weight to the first feature based on the derived probability;

an image recognition module configured to perform the image recognition process on an image, the image recognition process utilizing a voting process, for each one or more features, for one or more landmarks in the plurality of image exemplars, the voting process for the first feature weighted according to the weight assigned to the first feature.

11. The apparatus of claim 10, wherein the deriving the probability utilizes the formula $$p(\Delta L(f_i^r)) = \sum_{r' \neq r} \sum_j \frac{\Psi(\|\Delta L(f_i^r) - \Delta L(f_j^{r'})\|)}{N},$$

wherein N is a normalization factor, $f_i^r$ is feature i in exemplar r, and D(r) is a landmark location in exemplar r.

12. The apparatus of claim 10, wherein the image recognition process is a Hough-voting technique.

13. The apparatus of claim 10, further comprising a nonparametric shape regularization module configured to perform nonparametric shape regularization by using a dynamic number of top face exemplars and ensuring that the selected landmark locations using the image recognition process are also consistent with the spatial arrangement of landmarks in the dynamic number of top face exemplars.

14. A non-transitory machine-readable storage medium comprising a set of instructions which, when executed by a processor, causes execution of operations of performing image recognition using a plurality of image exemplars, each of the image exemplars having a plurality of features, the operations comprising:

for each of the image exemplars, determining a first location offset between an actual landmark location for a first landmark in the image exemplar and a predicted landmark location for the first landmark in the image exemplar, the predicted landmark location derived using an image recognition process using a first feature of the image exemplar, wherein the first location offset for each of the image exemplars is relative to a size of a face in each of the image exemplars;

deriving a probability that the image recognition process applied using the first feature produces an accurate identification of the first landmark in the image exemplars based on the first location offsets for each of the image exemplars;

assigning a weight to the first feature based on the derived probability; and performing the image recognition process on an image, the image recognition process utilizing a voting process, for each of one or more features, for one or more landmarks in the plurality of image exemplars, the voting process for the first feature weighted according to the weight assigned to the first feature.

15. The non-transitory machine-readable storage medium of claim 14, wherein deriving the probability includes summing all of the first location offsets for the image exemplars.

16. The non-transitory machine-readable storage medium of claim 14, wherein the plurality of image exemplars are chosen such that only similar faces are utilized, wherein faces are similar if images depict the faces from approximately the same angle, rotation, and scale.

17. The non-transitory machine-readable storage medium of claim 14, wherein the image recognition process is weighted for each feature in the plurality of exemplar images.

18. The non-transitory machine-readable storage medium of claim 14, wherein the weight assigned to the first feature is further modulated by a spatial weight based on the proximity of the first feature to the first landmark.

* * * * *